$A = Al_2O_3$ ; $B = B_2O_3$ ; $S = SiO_2$

United States Patent Office 3,540,895
Patented Nov. 17, 1970

3,540,895
PROCESS FOR THE MANUFACTURE OF
A DEVITRIFIED GLASS
Herwig Scheidler and Jurgen Petzold, Mainz Mombach, and Werner Sack, Mainz Gonsenheim, Germany, assignors to JENAer Glaswerk Schott & Gen., Mainz, Germany, a corporation of Germany
Filed Dec. 20, 1967, Ser. No. 692,053
Claims priority, application Germany, Dec. 31, 1966,
J 32,675
Int. Cl. C04b 33/00
U.S. Cl. 106—39            3 Claims

ABSTRACT OF THE DISCLOSURE

The steps of adding to a composition of at least 85% by weight of $SiO_2+Al_2O_3+B_2O_3$, quantities up to a maximum of 15% by weight of MgO, CaO, BaO, ZnO, PbO and F to form a mixture, melting the mixture, cooling the mixture and then subjecting the mixture to a heat treatment above the transformation temperature to convert it into a semi-crystalline substance which is free of alkali oxide and having excellent refractory and dielectric properties. A nucleating agent, for example, $ZrO_2$ is also used in forming the initial mixture.

The glass preferably has the following composition in weight percent:

| | |
|---|---|
| $SiO_2$ | 40–60 |
| $Al_2O_3$ | 20–30 |
| $B_2O_3$ | 5–25 |
| ZnO | 0–3 |
| MgO | 0–3 |
| CaO | 0–3 |
| BaO | 0–5 |
| PbO | 0–5 |
| $ZrO_2$ | 1.5–3 |

The invention relates to a process for the manufacture of a devitrified glass which is free of alkali oxide and is possessed of excellent refractory and dielectric properties.

The manufacture of devitrified glasses by the controlled and therefore homogeneous and finely crystalline devitrification of certain starting glasses has become increasingly popular in the past ten years. The systems, $SiO_2$-$Al_2O_3$-$Li_2O$, $SiO_2$-$Al_2O_3$-RO (alkali-free), $SiO_2$-$Al_2O_3$-$R_2O$ and $SiO_2$-ZnO-$Li_2O$-PbO, as well as compositions containing no $SiO_2$, have been used as basic compositions. Larger or smaller amounts of other oxides are added to these basic compositions, in addition to various nucleating agents.

The suitability of the basic system, $SiO_2$-$Al_2O_3$-$B_2O_3$, for the manufacture of devitrified glasses has hardly been recognized heretofore.

An object of the present invention is a process for the manufacture of an alkali oxide-free devitrified glass having desirable thermal and dielectric properties, using nucleating agents such as $ZrO_2$ in a silica-alumina-boric oxide system.

Another object of the invention is to provide improved alkali oxide-free devitrified glass of the character described.

Figure 1:
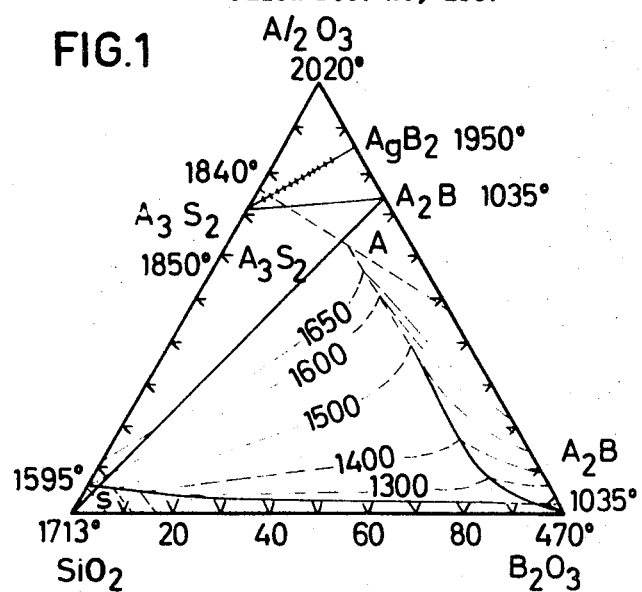
Figure 2:
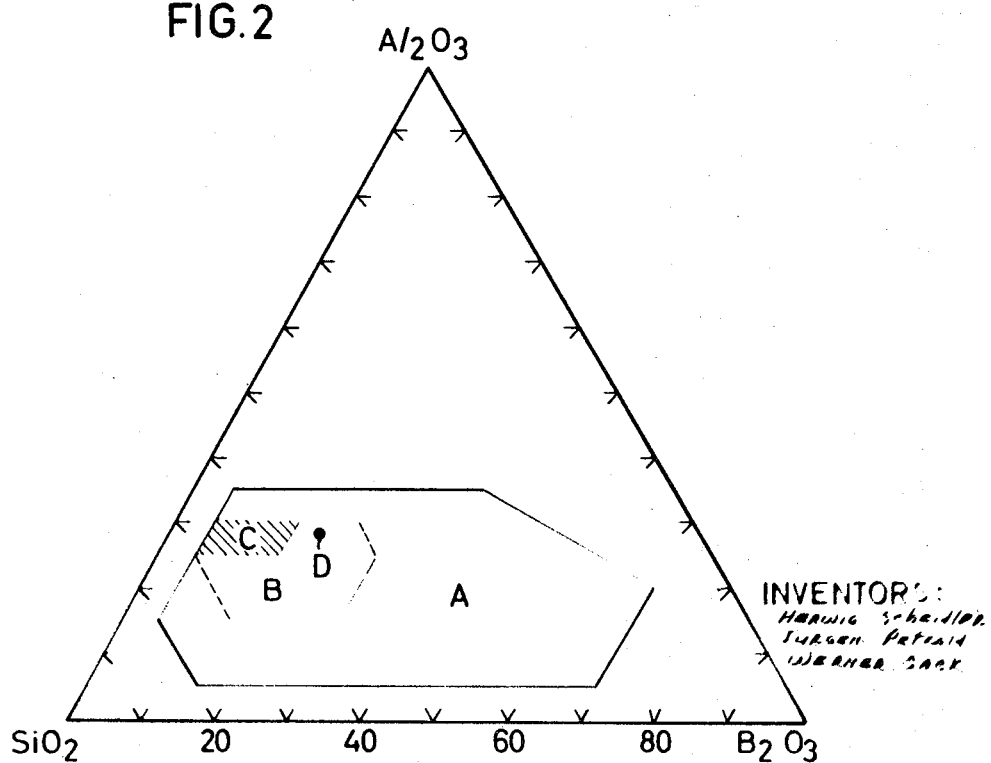

These and other objects and advantages of the invention will become apparent from a consideration of the following disclosure which includes the accompanying drawings in which:

FIG. 1 is a phase diagram; and
FIG. 2 is a diagram showing the concentration area A of the three-component system indicating the compositions as regards the principal components which result in glasses at melting temperatures of 1620° C., or less and which can be transformed by a suitable temperature treatment into a homogeneous devitrified glass.

In accordance with the invention it has now been found that alkali oxide-free devitrified glass having desirable thermal and dielectric properties is obtained by adding MgO, CaO, BaO, ZnO, PbO and F in an amount of up to 13% of the total weight, to a composition forming at least 85% of the total weight and consisting of silica, alumina and boric oxide, melting the resulting mixture and thereafter cooling. The cooled batch is then subjected to a known and defined heat treatment above the transformation point ($\eta \geq 10^{14}$ poises) to convert it into a semi-crystalline substance.

The system $SiO_2$-$Al_2O_3$-$B_2O_3$ as shown in FIG. 1, in addition to the pure components, there exist according to the said source, has been described in Phase Diagrams for Ceramists, the crystalline phases $3Al_2O_3 \cdot 2SiO_2$, $9Al_2O_3 \cdot 2B_2O_3$ and $2Al_2O_3 \cdot B_2O_3$. According to Dietzel and Scholze, Glastechnische Berichte 28 (1955) pages 47–51, the system $9Al_2O_3 \cdot 2B_2O_3$ and $3Al_2O_3 \cdot 2SiO_2$ forms a series of solid solutions about whose properties nothing has been known heretofore.

For the following reasons the system in accordance with the invention appears to be suitable as a basis for preparing devitrified glass:

(1) There are some easily fusible compositions in the low alumina concentration range.

(2) The absence of alkali oxides indicates that the electrical and dielectric properties will be good.

(3) The melting points of the crystalline phases of the system as set out in FIG. 1 also suggest high melting points and devitrified glasses capable of withstanding great thermal stress.

It is recognized that a technically usable devitrified glass cannot consist of a pure three-component system. The melting, cooling and crystallization behavior must be controlled by the addition of appropriate additional oxides without thereby impairing the resultant desirable properties. Furthermore, the addition of a nucleating agent for the achievement of a finely crystalline structure is advantageous.

Area B in FIG. 2 is a smaller area indicating those concentrations of the basic components which provide devitrified glasses of particularly fine crystalline structure, good dielectric characteristics and good refractory indices.

Devitrified glasses whose compositions are indicated as regards the main components, by areas C and D in FIG. 2, offer particularly high refractory values and have most advantageous dielectric properties (see Table 2).

A precise definition of the composition for devitrified glass in region D resulted in a silica content (in percent by weight) of 47 plus or minus 1%. (The phase diagram in FIG. 2 includes only the 3 main components, silica, boric oxide and alumina, taken as 100% by weight.)

With the foregoing silica content, the ratio of silica to alumina amounts to 1.8–2.0, the ratio of alumina to boric oxide amounts to 2.3–2.4, and the ratio of silica to boric oxide amounts to approximately 1.3. A zinc oxide content greater than 1.5% increases the loss factor (LF). MgO and CaO also have an adverse effect on the loss factor. In concentrations under 5%, BaO and PbO do not have any important effect on it. The loss factor LF (tan $\delta \times$ dielectric constant) of such devitrified glasses is less than $35 \times 10^{-4}$, while their refractory properties are good. The loss factor was measured at a frequency of 1 mHz. and a temperature of 25° C.

The compositions corresponding to area C in FIG. 2 also result in and have a devitrified glass having high refractoriness and have a pyrometric cone equivalent greater than 1400° C., approximate Seger cone No. 13, along with loss factors of as much as $65 \times 10^{-4}$.

The pyrometric cone equivalent was taken as the measure of refractoriness because, on the one hand, the determination of a liquidus point of the ceramic samples was difficult, and on the other hand the pyrometric cone equivalent provides information that is of greater practical value.

The devitrified glasses obtained by the process of the invention contain crystalline phases consisting mainly of mixed crystals of the series $9Al_2O_3 \cdot 2B_2O_3$-$3Al_2O_3 \cdot 2SiO_2$. The chemical composition of the mixed crystals depends on the ratio of the main components in the devitrified glass. In a number of samples, small amounts of the crystalline phase $2Al_2O_3 \cdot B_2O_3$ and mixed crystals of the spinel series $MgAl_2O_4$-$Zn \cdot Al_2O_4$ were detected by X-ray analysis.

In order to more clearly illustrate the invention, the compositions and some of the characteristics of a small number of the glasses and devitrified glasses are set out in the Tables I and II which follow:

39.27 kg. barium carbonate
2.54 kg. zirconium oxide.

The raw materials are generally the conventional natural or synthetic raw materials, but they must be free of any appreciable amounts of impurities and especially of alkali oxides.

The mixture is melted as described previously. The molten glass is refined, and then it is formed in the desired shape.

A sample is taken from the cooled glass and it is transformed into the vitreous-crystalline state by the following program:

The glass object is heated at 5° C. per minute to 840° C. and held at this temperature for 2 hours. It is then further heated at 2° C. per minute to 1120° C. and kept at this temperature for 3 hours. Following the foregoing holding period, the temperature is again raised at 2° C./min. to 1310° C. and the specimen is held at this temperature for 6 hours. Then the specimen is cooled at about 5° C./min. down to room temperature.

The "specimen thus "ceramized" is not deformed, and

TABLE I

| | Composition in Weight, percent | | | | | | | | |
|---|---|---|---|---|---|---|---|---|---|
| | $SiO_2$ | $Al_2O_3$ | $B_2O_3$ | ZnO | MgO | BaO | CaO | PbO | ZrO |
| Batch No.: | | | | | | | | | |
| 1 | 47.24 | 26.13 | 20.10 | 1.01 | | 2.01 | | 1.01 | 2.51 |
| 2 | 47.47 | 26.26 | 20.20 | 0.51 | | 3.03 | | | 2.53 |
| 3 | 47.24 | 26.13 | 20.10 | | | 2.01 | | 2.01 | 2.51 |
| 4 | 46.77 | 25.87 | 19.90 | 1.00 | | 1.99 | 1.99 | | 2.49 |
| 5 | 54.30 | 25.34 | 10.86 | 5.43 | 1.81 | | | | 2.26 |
| 6 | 54.30 | 26.24 | 10.86 | 5.43 | 0.90 | | | | 2.26 |
| 7 | 54.30 | 26.24 | 10.86 | 2.71 | 0.90 | 2.71 | | | 2.26 |
| 8 | 54.30 | 23.53 | 13.57 | 2.71 | | 2.71 | | 0.90 | 2.26 |

TABLE II.—CHARACTERISTICS OF THE DEVITRIFIED GLASS AFTER TRANSFORMATION

| | $\alpha 20\text{-}300 \times 10^7$ 1/° C. | D, g./ccm. | $T_{K100}$, °C. | $tg\delta \times 10^4$ 1 MHz., 25° C. | Diel. constant, 1 MHz., 25° C. | Loss factor, $10^4$ | SKF, °C. | Crystalline phases | | |
|---|---|---|---|---|---|---|---|---|---|---|
| | | | | | | | | MK | SP | $ZrO_2$ |
| Batch No.: | | | | | | | | | | |
| 1 | | | 435 | 5.8 | 4.8 | 27.6 | 1,330 | + | − | + |
| 2 | | | 429 | 5.8 | 4.7 | 27.5 | 1,435 | + | − | + |
| 3 | 36.8 | | 421 | 6.6 | 4.8 | 31.5 | | + | − | + |
| 4 | 34.5 | | 387 | 8.0 | 4.9 | 39.3 | | + | − | + |
| 5 | | | 353 | 13.3 | 4.86 | 64.64 | 1,470 | + | + | + |
| 6 | | | 350 | 11.1 | 4.71 | 52.28 | 1,490 | + | + | + |
| 7 | 32.1 | 2.55 | 342 | 13.0 | 5.05 | 65.6 | 1,520 | + | − | + |
| 8 | 32.6 | 2.51 | 374 | 9.0 | 4.90 | 44.1 | 1,490 | + | − | + |

NOTE.—MK=Mixed crystals of the series $9Al_2O_3 \cdot 2B_2O_3=3 Al_2O_3 \cdot 2SiO_2$; SP=Spinels of the series (Mg, Zn) $Al_2O_4$.

The following example is given in order to more clearly illustrate the process aspect of the instant invention.

EXAMPLE

The batch mixture of the components listed in Table I with the components partially in the form of their corresponding carbonates or nitrates, is melted at temperatures of less than 1620° C. and refined. The glass is then cast, drawn or rolled by conventional methods.

The cooled glass is then, after further mechanical working, if desired, transformed into a devitrified glass by the conventional multi-stage transformation program at a maximum of 1320° C. The devitrified glass thus obtained is pure white, shows no deformation from the original shape, and has the characteristics as disclosed in Table II.

The example which follows results in the production of the composition identified as Batch 2 in Table I (supra).

In order to produce a calculated 100 kg. of glass, the following materials are required:

47.57 kg. sand
39.49 kg. aluminum hydrate
35.76 kg. boric oxide
0.52 kg. zinc oxide has a pure white color. The crystal phase consists mostly of a mixed crystal of the series $$9Al_2O_3 \cdot 2B_2O_3\text{-}3Al_2O_3 \cdot 2SiO_2$$

and of small amounts of $ZrO_2$.

The resulting specimen exhibits the following dielectric characteristics:

tan $\delta \times 10^4$ (1mHz., 25° C.) =5.8
dielectric constant (1 mHz., 25° C.) =4.7.

The pyrometric cone equivalent of the specimen is approximately Seger cone No. 15 (1435° C.).

Having thus set forth the nature of the invention, what is claimed is:

1. A process for the manufacture of a devitrified glass which is free of alkali oxide and which has excellent refractory and dielectric properties which comprises adding to a composition comprising at least 85% by weight of $SiO_2$ and $Al_2O_3$ plus $B_2O_3$ and 2 to 5% by weight of a nucleating agent, quantities up to a maximum of 13% by weight of at least one member selected from the group consisting of MgO, CaO, BaO, ZnO and PbO to form a homogeneous mixture, melting the mixture, cooling the mixture and thereafter heating the cooled mixture to a temperature above the transformation temperature ($\eta \leq 10^{14}$ poises) whereby the mixture is converted into a semicrystalline substance wherein the mixture subjected to melting is substantially free of alkali metal and has the following composition in weight:

| | |
|---|---|
| $SiO_2$ | 40–60 |
| $Al_2O_3$ | 20–30 |
| $B_2O_3$ | 5–25 |
| ZnO | 0–3 |
| MgO | 0–3 |
| CaO | 0–3 |
| BaO | 0–5 |
| PbO | 0.5 |
| $ZrO_2$ | 1.5–3 |

2. A process according to claim 1 wherein the mixture subjected to melting has the following composition in percent by weight:

| | |
|---|---|
| $SiO_2$ | 46–48 |
| $Al_2O_3$ | 25.5–26.5 |
| $B_2O_3$ | 19.5–20.5 |
| ZnO | 0–1 |
| BaO | 0–3.5 |
| PbO | 0–2.5 |
| $ZrO_2$ | 2.0–3.0 |

3. A devitrified glass produced by the process of claim 1.

References Cited

UNITED STATES PATENTS 3,057,691 10/1962 Veres _____ 65—33 XR
3,110,619 11/1963 Koenig et al. _____ 65—33 XR

OTHER REFERENCES

McMillan, P. W.: Glass Ceramics, Academic Press, London and New York, 1964, pp. 61–64, 75–84.

McMillan, P. W.: Glass Ceramics Academic Press, London and New York, 1964, pp. 158–174.

Dietzel and Scholze: "Untersuchungen in System $B_2O_3$-$Al_2O_3$-$SiO_2$," Glastechnische Berichte 28 (1955), pp. 47–51.

S. LEON BASHORE, Primary Examiner

J. H. HARMAN, Assistant Examiner

U.S. Cl. X.R.

65—33